United States Patent
Lorenz et al.

(10) Patent No.: US 10,961,346 B2
(45) Date of Patent: Mar. 30, 2021

(54) METHOD FOR THE PREPARATION OF POLYOXYALKYLENE POLYOLS

(71) Applicant: COVESTRO DEUTSCHLAND AG, Leverkusen (DE)

(72) Inventors: Klaus Lorenz, Dormagen (DE); Ingo Danek, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/098,218

(22) PCT Filed: May 11, 2017

(86) PCT No.: PCT/EP2017/061399
§ 371 (c)(1),
(2) Date: Nov. 1, 2018

(87) PCT Pub. No.: WO2017/194709
PCT Pub. Date: Nov. 16, 2017

(65) Prior Publication Data
US 2019/0161577 A1 May 30, 2019

(30) Foreign Application Priority Data

May 13, 2016 (EP) ..................... 16169660

(51) Int. Cl.
| | | |
|---|---|---|
| C08G 65/26 | (2006.01) | |
| C08G 18/32 | (2006.01) | |
| C08G 18/48 | (2006.01) | |
| C08L 75/08 | (2006.01) | |

(52) U.S. Cl.
CPC ..... *C08G 65/2663* (2013.01); *C08G 18/3206* (2013.01); *C08G 18/4829* (2013.01); *C08G 18/4866* (2013.01); *C08G 65/2609* (2013.01); *C08G 65/2648* (2013.01); *C08L 75/08* (2013.01)

(58) Field of Classification Search
CPC ............ C08G 65/2663; C08G 65/2648; C08G 65/2696
See application file for complete search history.

(56) References Cited

U.S. PATENT DOCUMENTS

| | | |
|---|---|---|
| 3,404,109 A | 10/1968 | Milgrom |
| 3,538,043 A | 11/1970 | Herold |
| 3,823,145 A | 7/1974 | Louvar et al. |
| 3,829,505 A | 8/1974 | Herold |
| 3,941,849 A | 3/1976 | Herold |
| 4,110,268 A | 8/1978 | Longley et al. |
| 4,355,188 A | 10/1982 | Herold et al. |
| 4,500,704 A | 2/1985 | Kruper, Jr. et al. |
| 4,521,548 A | 6/1985 | Christen et al. |
| 4,721,818 A | 1/1988 | Harper et al. |
| 4,877,906 A | 10/1989 | Harper |
| 4,987,271 A | 1/1991 | Watabe et al. |
| 5,010,047 A | 4/1991 | Schuchardt |
| 5,032,671 A | 7/1991 | Harper |
| 5,099,075 A | 3/1992 | Katz et al. |
| 5,158,922 A | 10/1992 | Hinney et al. |
| 5,391,722 A | 2/1995 | Chandalia et al. |
| 5,470,813 A | 11/1995 | Le-Khac |
| 5,536,883 A | 7/1996 | Le-Khac |
| 5,637,673 A | 6/1997 | Le-Khac |
| 5,714,428 A | 2/1998 | Le-Khac |
| 5,786,405 A | 7/1998 | Schilling et al. |
| 5,789,626 A | 8/1998 | Le-Khac |
| 5,919,988 A | 7/1999 | Pazos et al. |
| 6,018,017 A | 1/2000 | Le-Khac |
| 6,077,978 A | 6/2000 | McDaniel et al. |
| 6,376,625 B1 | 4/2002 | Cosman et al. |
| 6,646,100 B2 | 11/2003 | Hofmann et al. |
| 6,710,096 B2 | 3/2004 | Neff et al. |
| 6,780,813 B1 | 8/2004 | Hofmann et al. |
| 6,827,858 B2 | 12/2004 | Bader et al. |
| 6,835,687 B2 | 12/2004 | Hofmann et al. |
| 7,008,900 B1 | 3/2006 | Hofmann et al. |
| 7,919,575 B2 | 4/2011 | Browne |
| 8,134,022 B2 | 3/2012 | Haider et al. |
| 8,501,904 B2 | 8/2013 | Lorenz et al. |
| 8,865,945 B2 | 10/2014 | Lorenz et al. |
| 9,074,044 B2 | 7/2015 | Weston et al. |
| 9,556,309 B2 | 1/2017 | Laiter et al. |
| 2004/0167316 A1 | 8/2004 | Anderson et al. |
| 2005/0096488 A1* | 5/2005 | Kaushiva ........... C08G 18/4841 568/679 |
| 2005/0177005 A1 | 8/2005 | Ruppel et al. |
| 2010/0324340 A1 | 12/2010 | Pazos et al. |
| 2013/0059936 A1* | 3/2013 | Sasaki ............... C08G 18/4829 521/137 |

(Continued)

FOREIGN PATENT DOCUMENTS

| | | |
|---|---|---|
| EP | 0022453 A1 | 1/1981 |
| EP | 0406440 A1 | 1/1991 |

(Continued)

OTHER PUBLICATIONS

Ionescu et al. in "Advances in Urethane Science & Technology", 1998, 14, p. 151-218.

(Continued)

*Primary Examiner* — Michael M Dollinger
(74) *Attorney, Agent, or Firm* — N. Denise Brown

(57) ABSTRACT

The invention relates to a two-stage method for the preparation of polyoxyalkylene polyols having low equivalent molar masses, in which the method requires no reprocessing. The invention is characterized in that, in the first stage, a polyoxyalkylene polyol precursor is provided, which contains the salts of a strong Bronsted acid, and in that, in a second stage, the polyoxyalkylene polyol precursor is further reacted with alkylene oxides under DMC catalysis.

15 Claims, No Drawings

(56) References Cited

U.S. PATENT DOCUMENTS

2013/0338331 A1 12/2013 Lorenz et al.
2014/0018459 A1 1/2014 Shutov et al.

FOREIGN PATENT DOCUMENTS

| JP | 04145123 A | 5/1992 |
| JP | 06157743 A | 6/1994 |
| JP | 1030023 A | 2/1998 |
| WO | 9620972 A2 | 7/1996 |

OTHER PUBLICATIONS

Ullmann's Encyclopedia of Industrial Chemistry, vol. B4, pp. 167 ff., 5th ed., 1992.

* cited by examiner

METHOD FOR THE PREPARATION OF POLYOXYALKYLENE POLYOLS

CROSS-REFERENCE TO RELATED APPLICATIONS

This application is a national stage application under 35 U.S.C. § 371 of PCT/EP2017/061399, filed May 11, 2017, which claims the benefit of European Application No. 16169660.4, filed May 13, 2016, both of which are being incorporated by reference herein.

FIELD

The present invention provides a workup-free process for preparing polyoxyalkylene polyols, the polyoxyalkylene polyols obtainable by the workup-free process and for the use of the polyoxyalkylene polyols of the invention for preparation of polyurethanes.

BACKGROUND

Polyoxyalkylene polyols suitable for the preparation of polyurethanes can be obtained via various preparation processes. One process of significance on the industrial scale is the base-catalyzed addition of alkylene oxides onto H-functional starter compounds, and another is the use of double metal cyanide compounds as catalysts ("DMC catalysts") for the addition of alkylene oxides onto H-functional starter compounds. The addition of alkylene oxides onto suitable starter compounds which is catalyzed by (Lewis) acids is of minor importance owing to the tendency to form unwanted by-products.

Among the basic catalysts, the alkali metal hydroxides of the greatest significance. They allow the problem-free preparation of short-chain polyoxyalkylene polyols and/or polyoxyalkylene polyols having a high ethylene oxide content, but the catalyst in the alkaline crude polymer generally has to be removed by means of a separate workup step. In general, optionally after a preceding hydrolysis step, this is accomplished by neutralization with a sufficiently strong acid, followed by a distillation step. The salts that precipitate out here typically have to be removed by a filtration step. Distillation and filtration processes are time-consuming and energy-intensive and additionally, in some cases, do not have good reproducibility. Therefore, many processes that do not need a filtration step and in many cases do not need a distillation step either have been developed: Neutralization with hydroxycarboxylic acids such as lactic acid is described in WO 9820061 and US 2004167316 for the workup of short-chain polyols for rigid foam applications; these are widely used and well-established processes. U.S. Pat. No. 4,521,548 shows how the polymerization-active sites can be deactivated in a similar manner by reaction with formic acid. The metal carboxylates formed after neutralization with hydroxycarboxylic acids or formic acid are soluble in aqueous solution in the polyoxyalkylene polyols and are therefore normally left in the end products.

However, a disadvantage in these processes is the catalytic activity of the salts of the comparatively weak acids that remain in the products, which is unwanted for many polyurethane applications. In JP-A 10-30023 and U.S. Pat. No. 4,110,268, neutralization is therefore accomplished using aromatic sulfonic acids or organic sulfonic acids which likewise form salts soluble to give a clear solution in the polyoxyalkylene polyols, but ones that are less basic and feature lower catalytic activity. A crucial disadvantage here is the high costs of the sulfonic acids. Workup by means of acidic cation exchanges as described in DE-A 100 24 313 entails the use of solvents and the distillative removal thereof, and is thus likewise associated with high costs. The phase separation processes that are likewise occasionally employed require merely a hydrolysis step, but not a neutralization step, and are described, for example, in WO 0114456, JP-A 6-157743, WO 9620972 and U.S. Pat. No. 3,823,145. The use of coalescers or centrifuges assists the phase separation of the polyoxyalkylene polyols from the alkaline aqueous phase; here too, it is often necessary to add solvent in order to increase the difference in density between the polyalkylene polyol phase and the water phase. Processes of this kind are not suitable for all polyoxyalkylene polyols; in particular, they are unsuccessful in the case of short-chain polyoxyalkylene polyols.

If the polyoxyalkylene polyols to be prepared have exceptional structural properties, for example a sufficiently high content of oxyethylene units, or starter compounds containing amino groups have been used, it is possible via the choice of the ratio of sulfuric acid to basic catalyst in the polyoxyalkylene polyols to produce soluble sulfuric salts which can remain in the products and do not disrupt subsequent reactions to give the polyurethane material owing to their neutral to slightly acidic character. Processes of this kind are described in patent specifications EP 2028211 A1 and WO 2009/152954.

Amines can also be used as catalysts for the addition of alkylene oxide onto H-functional starter compounds, as described, for example, by Ionescu et al. in "Advances in Urethane Science & Technology", 1998, 14, p. 151-218. By means of aminic catalysis, it is only possible to obtain polyoxyalkylene polyols with comparatively low equivalent molar masses. The residues of aminic catalysts are likewise soluble in the polyoxyalkylene polyols and can remain in the products. However, it is also true of these that, because of their basic character, they can influence the course of reaction in downstream reaction steps, possibly in an undesirable manner.

The equivalent molar mass of materials containing active hydrogen atoms is understood to mean the total mass of the material containing active hydrogen atoms divided by the number of active hydrogen atoms. In the case of materials containing hydroxyl groups (for example polyoxyalkylene polyols), they are related to the OH number (hydroxyl number) as follows:

$$\text{equivalent molar mass} = (56\ 100\ [\text{mg/mol}])/(\text{OH number [mg KOH/g]}) \quad (I)$$

The equivalent molar mass of the polyoxyalkylene polyols is thus ascertained according to formula (I), where the hydroxyl number of the polyoxyalkylene polyol can be ascertained according to DIN 53240 or determined spectroscopically by NIR.

As compared with the classes of catalyst mentioned so far, DMC catalysts from the most recent generation as described, for example, in U.S. Pat. No. 5,470,813, EP-A 700949, EP-A 743093, EP-A 761708, WO-A 97/40086, WO-A 98/16310 and WO-A 00/47649 have exceptionally high activity and enable the preparation of polyoxyalkylene polyols having high equivalent molar masses with very low catalyst concentrations (25 ppm or less), such that no removal of the catalyst from the finished product is required, nor is there any expected influence of the residues originating from the DMC catalysts on the characteristics of polyols produced in this way in further reaction steps to give the polyurethane. A typical example is that of the highly active DMC catalysts which are described in EP-A 700949 and contain not only a double metal cyanide compound (e.g. zinc hexacyanocobaltate(III)) and an organic complex ligand (e.g. tert-butanol) but also a polyether having a number-average molecular weight greater than 500 g/mol.

A characteristic of DMC catalysts is their marked sensitivity to high concentrations of hydroxyl groups which are caused, for example, by large amounts of starters such as ethylene glycol, propylene glycol, glycerol, trimethylolpropane, sorbitol or sucrose, and polar impurities in the reaction mixture. The DMC catalysts in that case, for example, cannot be converted to the polymerization-active form during the reaction initiation phase, or alkylene oxide addition reactions that are already running can stop as a result of the presence of a hydroxyl group concentrations. This naturally limits the usability of DMC catalysts for the preparation of short-chain polyoxyalkylene polymer is having OH numbers of not less than 200 mg KOH/g which find use, for example, in the production of rigid foams There has therefore been no lack of attempts to make the indisputable advantages of DMC catalysis utilizable for the preparation of short-chain polyoxyalkylene polyols as well.

WO 2011/075333 A1 describes a fully continuous production process to be conducted at high reaction temperature and under DMC catalysis for polyoxyalkylene polyols having OH numbers of up to 660 mg KOH/g. The disadvantage of such continuous processes is there a lack of flexibility in the event of product changes; in addition, the continuous stable metered addition of solid starters, for example sorbitol, trimethylolpropane, pentaerythritol or sugars, is found to be difficult. The metered addition of such starters has to be effected via metering zones that are heated at high cost or in solution. A batchwise process for the preparation of short-chain polyoxyalkylene polyols is the subject of WO 2012/134849: In an alkylene oxide addition step catalyzed by "superacids", what are first obtained are precursors which, after neutralization of the precursor, are converted in a subsequent second reaction step under DMC catalysis to the end products, short-chain polyoxyalkylene polyols having OH numbers between 140 and 625 mg KOH/g. The disadvantage of this process lies in the use of the superacids in the first process step, which promotes the formation of unwanted by-products, for example of dioxolanes and dioxanes. Catalysts of this kind are therefore not normally used in commercial production processes and would first have to be introduced at many sites. A process to be conducted batchwise is likewise described in WO 2012/091968: The conversion of the DMC catalyst to the active state is facilitated by the addition of magnesium compounds or compounds of metals on groups 3-15 of the Periodic Table, or of compounds of the lanthanides, and its activity is increased. A disadvantage here too is of course the use of additional components; moreover, it appears that, in principle, only alkylene oxide addition products prefabricated separately from the actual starter compounds by a process which is not described any further are suitable as starting compounds for the DMC-catalyzed step. An effective measure for lowering the concentrations of hydroxyl groups in DMC-catalyzed batchwise processes if the meat addition of the low molecular weight H-functional starter compound(s) in parallel to the metered addition of the alkylene oxide(s). This "process for continuous metered addition of starter" is disclosed in WO-A 97/29146. A further development of the process of parallel metered addition of low molecular weight starter compound and alkylene oxide with the aim of preparation of polyoxyalkylene polyols with lower equivalent molar masses is presented by the teaching of EP 1577334:

The sensitivity of the DMC catalyst to high hydroxyl group concentrations is lowered by the addition of small amounts of inorganic or organic Brønsted acids to the low molecular weight starter compound metered in. In this process too, the need to initially charge a starter polyol prefabricated by alkylene oxide addition is found to be disadvantageous; the continuous stable metered addition of solid starters, for example sorbitol, trimethylolpropane or sugars, can likewise be found to be problematic. In US-A 2010/0324340 it was found that, in the process for continuous metered addition of starter, too high a water content in the starter stream is found to be a hindrance in the preparation of polyoxyalkylene polyols having low equivalent molar masses. Consequently, this application discloses a process in which low molecular weight H-functional starter compounds that have been adjusted to a minimum water content in a costly and inconvenient manner are used.

SUMMARY

It was therefore an object of the present invention to provide an efficient process for preparing polyoxyalkylene polyols with low equivalent molar masses which does not have disadvantages of the prior art processes. More particularly, the aim was a flexible process performable in a batchwise manner which additionally, if required, is also performable without the use of ethylene oxide and of course does not need any steps for removal of catalyst residues. The use of prefabricated alkylene oxide addition products as starter medium and the technically complex parallel metered addition of starter compound(s) and alkylene oxide were to be avoided. The DMC-catalyzed step of the process was to be capable of converting intermediate compounds having equivalent molar masses of ≤94 Da to polyols having equivalent molar masses of up to 280 Da, preferably up to 225 Da, more preferably up to 187 Da, and with minimum DMC catalyst concentrations based on the overall reaction mixture of preferably ≤150 ppm.

The object was surprisingly achieved by a two-stage process for preparing a polyoxyalkylene polyol 1) by reacting at least one H-functional starter compound with at least one alkylene oxide, comprising the following steps:
  i) providing a component A) comprising a polyoxyalkylene polyol A1) having a calculated OH number (OHN$_{A1}$) of 600 to 1060 mg KOH/g and a neutral or acidic salt of an inorganic Brønsted acid by
    i-1) reacting an H-functional starter compound with one or more alkylene oxides B1) using a basic catalyst,
    i-2) reacting the mixture resulting from i-1) with a Brønsted acid having a pKa<1,
  ii) subsequently reacting component A) with one or more alkylene oxides B2) in the presence of a DMC catalyst, wherein
    ii-1) the component A) resulting from step i) is admixed with a DMC catalyst and stripped at a temperature $T_S$ of not more than 145° C.
    and
    ii-2) the mixture resulting from ii-1) is reacted with one or more alkylene oxides B2) to give a polyoxyalkylene polyol 1), where the quotient of the reaction temperature $T_R$ and the alkylene oxide metering rate $A_R$, defined as the percentage of the total mass of alkylene oxide to be metered in which is metered in per hour, is $$T_R/A_R < 5.9 \ [h \cdot ° C./\%]$$

and
  wherein the OH number of the polyoxyalkylenes 1) obtained after performance of step ii) is ≥200 mg KOH/g.

The present invention further provides polyoxyalkylene polyols 1) obtainable by the process of the invention, for the use of these polyoxyalkylene polyols 1) for preparation of polyurethanes, and polyurethanes comprising the polyoxyalkylene polyols 1) of the invention.

DETAILED DESCRIPTION

WO 2012/084762 claims a process for the preparation of polyoxyalkylene polyols having OH numbers of 3 mg KOH/g to 150 mg KOH/g, in which the starters used for a DMC-catalyzed step are likewise polyoxyalkylene polyols containing an acidic sulfuric salt. The specific demands on the reaction regime in the preparation of polyols having OH numbers of ≥200 mg KOH/g, especially the reduction in the thermal stress on the DMC catalyst in the presence of high concentrations of hydroxyl groups through compliance with the condition $T_R/A_R<5.9$ (h*° C./%), has not been recognized in WO 2012/084762.

The calculated OH number of the polyoxyalkylene polyol A1) ($OHN_{A1}$) determined by formula (II):

$OHN_{A1}$=((mass of the H-functional starter compound used in step i-1))×(OH number of the H-functional starter compound used in step i-1)))/(mass of the H-functional starter compound used in step i-1)+mass of the alkylene oxide B1 used in step i-1))     (II)

The $OHN_{A1}$ is 600-1060 mg KOH/g, preferably 700-1060 mg KOH/g and more preferably 800-1060 mg KOH/g.

i-1)

In step i-1), the basic catalysts used may be alkali metal hydroxides, alkaline earth metal hydroxides, alkali metal hydrides, alkaline earth metal hydrides, alkali metal carboxylates and/or alkaline earth metal carboxylates Alkali metals are selected from the group consisting of Li, Na, K, Rb, Cs and the alkaline earth metals are selected from the group consisting of Be, Ca, Mg, Sr, Ba.

Alternatively, it is possible to use organic basic catalysts, for example amines. These include aliphatic amines or alkanolamines such as N,N-dimethylbenzylamine, dimethylaminoethanol, dimethylaminopropanol, N-methyldiethanolamine, trimethylamine, triethylamine, N,N-dimethylcyclohexylamine, N-methylpyrrolidine, N,N,N',N'-tetramethylethylenediamine, diazabicyclo[2.2.2]octane, 1,4-dimethylpiperazine or N-methylmorpholine. Likewise efficiently usable are also aromatic amines such as imidazole and alkyl-substituted imidazole derivatives, N,N-dimethylaniline, 4-(N,N-dimethyl)aminopyridine and partly cross-linked copolymers of 4-vinylpyridine or vinylimidazole and divinylbenzene. A comprehensive overview of suitable amines has been given by M. Ionescu et al. in "Advances in Urethanes Science and Technology", 1998, 14, 151-218. Preferred aminic catalysts are tertiary aliphatic amines or alkanolamines, and also imidazole and the imidazole or pyridine derivatives mentioned Aminic catalysts of this kind can be used in concentrations, based on the amount of component A) obtained, of 200 ppm to 10 000 ppm, preference being given to the concentration range from 200 ppm to 5000 ppm.

Preferred basic catalysts are the alkali metal hydroxides, particular preference being given to sodium hydroxide, potassium hydroxide and/or cesium hydroxide, and very particular preference to potassium hydroxide. Such an alkali metal-containing catalyst can be supplied to the H-functional starter compound in the form of an aqueous solution or in solid form. Such inorganic basic catalysts may be used in concentrations, based on the amount of component A) obtained, of, for example, 40 ppm to 2000 ppm, preferably 40 ppm to 1000 ppm, more preferably 40 ppm to 500 ppm. Prior to commencement of the metered addition of the one or more alkylene oxide(s), the water of dissolution and/or the water released in the reaction of the active hydrogen atoms with the catalyst may be removed under reduced pressure at an absolute pressure of 1 to 500 mbar at temperatures of 20 to 200° C., preferably at 80 to 220° C. In some cases, the water of dissolution and the water released in the reaction of the active hydrogen atoms with the catalyst can also be left in the H-functional starter compound.

Basic catalysts used may also be prefabricated alkylene oxide addition products of H-functional starter compounds having alkoxylate contents of 0.05 to 50% by equivalents, called "polymeric alkoxylates". The alkoxylate content of the catalyst is understood to mean the proportion of active hydrogen atom is removed by deprotonation by a base, typically an alkali metal hydroxide, of all active hydrogen atoms that were originally present in the alkylene oxide addition product of the catalyst. The amount of the polymeric alkoxylate used is naturally guided by the catalyst concentration desired for the preparation of component A).

H-functional starter compounds are those compounds containing at least one Zerewitinoff-active hydrogen atom, sometimes also referred to merely as "active hydrogen". A hydrogen bonded to N, O or S is referred to as Zerewitinoff-active hydrogen when it affords methane by reaction with methylmagnesium iodide, by a method discovered by Zerewitinoff. Typical examples of compounds having Zerewitinoff-active hydrogen are compounds containing carboxyl, hydroxyl, amino, imino or thiol groups as functional groups. Suitable H-functional starter compounds usually have functionalities of 1 to 35, preferably of 1 to 8. The molar masses thereof are from 17 g/mol to 1200 g/mol. As well as the hydroxy-functional starters for use with preference, it is also possible to use amino-functional starters. Examples of hydroxy-functional starter compounds are methanol, ethanol, 1-propanol, 2-propanol, the isomers of butanol, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, glycerol, trimethylolpropane, pentaerythritol, sorbitol, sucrose, hydroquinone, catechol, resorcinol, 1,3,5-trihydroxybenzene, and methylol-containing condensates of formaldehyde and phenol or urea. It is also possible to use high-functionality starter compounds based on hydrogenated starch hydrolysis products. These are described, for example, in EP-A 1525244. Examples of suitable H-functional starter compounds containing amino groups are ammonia, ethanolamine, diethanolamine, triethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane, and also condensates of formaldehyde and melamine that contain methylol groups and Mannich bases. Starting compounds used may also be ring-opening products of cycling carboxylic anhydride and polyols which form very rapidly in situ after the two components have been combined. Examples are ring-opening products of phthalic anhydride, succinic anhydride and maleic anhydride on the one hand, and ethylene glycol, diethylene glycol, butane-1,2- diol, butane-1,3-diol, butane-1,4-diol, glycerol, trimethylolpropane, pentaerythritol or sorbitol on the other hand. In addition, it is also possible to use mono- or polyfunctional carboxylic acids directly as starter compounds.

In addition, it is also possible to add prefabricated alkylene oxide addition products of the starting compounds mentioned to the process, i.e. polyoxyalkylene polyols preferably having OH numbers of >600 to 1100 mg KOH/g, preferably 700 to 1000 mg KOH/g. It is also possible, in the process of the invention, to use polyester polyols preferably having OH numbers in the range from >600 to, for example, 800 mg KOH/g as (co-)starters with the aim of preparing polyetheresters. Polyester polyols suitable for this purpose may be prepared, for example, from organic dicarboxylic acids and polyhydric alcohols, preferably diols, by known processes.

In addition, H-functional starter substances used as (co-)starters may be polycarbonate polyols, polyestercarbonate polyols or polyethercarbonate polyols, preferably polycarbonate diols, polyestercarbonate diols or polyethercarbonate diols, preferably each having OH numbers in the range from 600 to 800 mg KOH/g. These are prepared, for example, by reaction of phosgene, dimethyl carbonate, diethyl carbonate or diphenyl carbonate with difunctional or higher-functionality alcohols or polyester polyols or polyetherpolyols.

The $OHN_{A1}$ is calculated by formula (II) using the number of —SH groups in the case of starter compounds containing thiol groups, the number of =NH groups in the case of starter compounds containing imino groups, the number of —COOH groups in the case of starter compounds containing carboxyl groups, and the number of hydrogen atoms bonded to amine nitrogen atoms in the case of starter compounds containing amine groups.

In the process of the invention, preferably, H-functional starter compounds free of amino groups and having hydroxyl groups serve as carriers for the active hydrogens, for example methanol, ethanol, 1-propanol, 2-propanol, the isomers of butanol, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, glycerol, trimethylolpropane, pentaerythritol, sorbitol, sucrose, hydroquinone, catechol, resorcinol, 1,3,5-trihydroxybenzene, methylol-containing condensates of formaldehyde and phenol and hydrogenated starch hydrolysis products. It is also possible to use mixtures of various H-functional starter compounds.

Preferably, in step i-1), the ratio [(molar amount [mol] of basic catalyst)/(molar amount [mol] of active hydrogen atoms in the starter compound(s))] is at least 1/8000.

The H-functional starter compounds initially charged in the reactor together with the basic catalysts are reacted with one or more alkylene oxides in step i-1) under inert gas atmosphere at temperatures of 80 to 180° C., preferably at 100 to 170° C., where the alkylene oxides are fed continuously to the reactor in the standard manner in such a way that the safety-related pressure limits for the reactor system used are not exceeded. Especially in the case of metered addition of ethylene oxide-containing alkylene oxide mixtures or pure ethylene oxide, it should be ensured that a sufficient partial inert gas pressure is maintained within the reactor during the startup and metering phase. This can be established, for example, by means of noble gases or nitrogen. The reaction temperature can of course be varied within the limits described during the alkylene oxide metering phase: it is advantageous first to alkoxylate sensitive H-functional starter compounds, for example sucrose, at low reaction temperatures and only to move to higher reaction temperatures when starter conversion is sufficient. The alkylene oxide may be supplied to the reactor in different ways: one option is metered addition into the gas phase or directly into the liquid phase, for example via an immersed tube or a distributor ring close to the reactor base in a zone with good mixing. In the case of metered addition into the liquid phase, the metering units should be designed should so as to be self-emptying, for example by introduction of the metering holes at the lower end of the distributor ring. Advantageously, it is possible by means of apparatus measures, for example the mounting of non-return valves, to prevent backflow of reaction medium into the alkylene oxide-conducting lines and metering units or into the alkylene oxide reservoir vessel. If an alkylene oxide mixture is being metered in, the respective alkylene oxides can be supplied to the reactor separately or as a mixture. Premixing of the alkylene oxides can be achieved, for example, by means of a mixing unit present in the common metering zone ("inline blending"). It has also been found to be useful to meter alkylene oxides, on the pump pressure side, individually or in premixed form into a pumped circulation system conducted, for example, through heat exchangers. In that case, for good mixing with the reaction medium, it is advantageous to integrate a high-shear mixing unit into the alkylene oxide/reaction medium stream. The temperature of the exothermic polymerization (alkylene oxide addition reaction) is kept at the desired level or adjusted to the desired level by cooling. According to the prior art relating to design of polymerization reactors for exothermic reactions (for example Ullmann's Encyclopedia of Industrial Chemistry, vol. B4, pp. 167 ff., 5th ed., 1992), such cooling is generally effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers. These heat exchange surfaces should be designed such that effective cooling is possible even on commencement of the metering phase, i.e. with a low fill level and/or with possibly high viscosity of the reacting reactor contents.

Generally, good mixing of the reactor contents should be ensured in all reaction phases through design and use of standard stirring units, suitable stirring units here being especially stirrers arranged over one or more levels or stirrer types which act over the full fill height (see, for example, Handbuch Apparate [Apparatus Handbook]; Vulkan-Verlag Essen, 1st ed. (1990), p. 188-208). Of particular technical relevance here is a mixing energy which is introduced on average over the entire reactor contents and is generally in the range from 0.2 to 5 W/L, with correspondingly higher local power inputs in the region of the stirrer units themselves and possibly in the case of relatively low fill levels. In order to achieve an optimal stirring effect, combinations of baffles (e.g. flat or tubular flow baffles) and cooling coils (or cooling candles) may be arranged within the reactor according to general prior art, and these may also extend across the vessel base. The stirring power of the mixing unit may also be varied as a function of the fill level during the metering phase, in order to ensure a particularly high mixing energy input in critical reaction phases. For example, it may be advantageous to particularly vigorously mix solids-containing dispersions which may be present at the start of the reaction, for example, in the case of use of sucrose. Moreover, particularly when solid H-functional starter compounds are used, it should be ensured through the selection of the stirrer unit that sufficient dispersion of the solids in the reaction mixture is assured. Preference is given here to using stirrer stages with close base clearance, and particularly stirrer units suitable for suspension. In addition, the stirrer geometry should contribute to reducing the foaming of reaction products. The foaming of reaction mixtures can be observed, for example, after the end of the metering and post-reaction phase, when residual alkylene oxides are additionally removed under reduced pressure, at absolute pressures in the range from 1 to 500 mbar. For such cases, stirrer units that achieve continuous mixing of the liquid surface have been found to be suitable. As required, the stirrer shaft has a base bearing and optionally further support bearings within the vessel. The stirrer shaft may be mounted from the top or bottom (with a central or eccentric arrangement of the shaft).

Alternatively, it is also possible to achieve the necessary mixing exclusively via a heat exchanger conducted pumped circulation system, or to operate this pumped circulation system as a further mixing component in addition to the stirrer unit, in which case the reactor contents are pumped in circulation as required (typically 1 to 50 times per hour). The specific mixing output introduced by means of pumped circulation, for example by means of an external heat exchanger or, in the case of recycling into the reactor, by means of a nozzle or injector, likewise amounts to values averaging from 0.2 to 5 W/L, this being based on the liquid volume present in the reactor and the pumped circulation system at the end of the reaction phase.

A wide variety of different reactor types are suitable for the performance of the process of the invention. Preference is given to using cylindrical vessels having a height/diameter ratio of 1:1 to 10:1. Useful reactor bases include hemispherical, dished, flat or conical bases, for example.

The end of the alkylene oxide metered addition phase in step i-1) be followed by a further reaction phase in which residual alkylene oxide is depleted. The end of this further reaction phase has been attained when no further pressure drop in the reaction vessel is detectable. After the reaction phase, traces of unreacted epoxides can optionally be removed under reduced pressure at an absolute pressure of 1 to 500 mbar. The alkaline alkylene oxide addition product can be hydrolyzed by water. However, this hydrolysis step is not essential for the performance of the process of the invention. The amount of water here is normally up to 15% by weight, based on the amount of the alkaline alkylene oxide addition product.

It is possible to use various alkylene oxides B1) for the process of the invention. They are preferably one or more compounds selected from the group consisting of ethylene oxide, propylene oxide, 1-butene oxide, 2,3-butene oxide and 2-methyl-1,2-propene oxide (isobutene oxide).

In the process of the invention, in step i-1), the alkylene oxide B1) used is more preferably propylene oxide, ethylene oxide or a mixture of propylene oxide and ethylene oxide. If mixtures of ethylene oxide and propylene oxide are used, these preferably have up to 50% by mass of ethylene oxide and more preferably up to 30% by mass of ethylene oxide, based on the total mass of the mixture of ethylene oxide and propylene oxide. Very particular preference is given to using exclusively propylene oxide. The alkylene oxides can be supplied to the reactor as individual components or as a mixture. It is likewise possible to feed two or more alkylene oxides to the reactor in succession, by which means it is possible to implement polyoxyalkylene chains with block structure. In the metered addition of two or more alkylene oxides, it is possible to change the composition of the alkylene oxide stream supplied continuously or instantaneously.

i-2)

According to the invention, the alkaline, polymerization-active sites in the crude, optionally hydrolyzed component A) from step i-1) is neutralized in step i-2) by the addition of a Brønsted acid having a pKa<1, preferably <0, more preferably <−1, which results in formation of the neutral or acidic salt of this Brønsted acid by reaction with the residues of the alkaline catalyst. Examples of such Brønsted acids are $HClO_4$, HI, HBr, HCl, $H_2SO_4$, $H_2SeO_4$, $HClO_3$, $HNO_3$, $FSO_3H$, $CH_3SO_3H$, $CF_3SO_3H$, $CF_3COOH$, $HPF_6$ and p-toluenesulfonic acid. The acids may be introduced in the form of a pure substance or in the form of a dilute aqueous solution. Preference is given to using diluted aqueous solutions of the Brønsted acids. Acetic salts are obtained by using polybasic acids, for example sulfuric acid or selenic acid, in a higher amount than the minimum amount needed for complete neutralization of the basic catalyst. After neutralization of KOH or $Ca(OH)_2$ with sulfuric acid, this affords, for example, $KHSO_4$ and $Ca(HSO_4)_2$, possibly as well as $K_2SO_4$ and $CaSO_4$. Of the polybasic acids mentioned, preference is given to using sulfuric acid. The amount of sulfuric acid used is preferably such that only the first dissociation stage in neutralization of the alkaline catalyst is active for at least 66%. In the case of neutralization of potassium hydroxide, this means that, for example, at least 0.75 mol of sulfuric acid is used per mole of KOH. Of the monobasic acids mentioned, preference is given to using perchloric acid.

The temperature can be varied within wide ranges in hydrolysis and neutralization; limits may result here from the corrosion resistance of the materials of the neutralization vessel or from the polyol structure. If hydrolysis-sensitive groups, for example ester groups, are present in the products, neutralization can also be effected at room temperature for example. In such cases, it is also advisable to dispense with a separate hydrolysis step upstream.

Any traces of water introduced via the neutralization with dilute aqueous solutions of the Brønsted acids can be removed at elevated temperature under reduced pressure at an absolute pressure of 1 to 500 mbar, optionally assisted by the introduction of an inert gas into the liquid phase.

During or after the neutralization, aging stabilizers or antioxidants can be added if required to the component A) obtained in this way, for example when component A) is to be stored intermediately prior to further conversion thereof. No further workup steps, for example filtration, are necessary. Component A) has equivalent molar masses of 53 to 94 Da.

Step ii)

In step ii), the DMC catalyst is added to component A) obtained by means of steps i-1) and i-2) and reacted with one or more alkylene oxides B2) until polyoxyalkylene polyols 1) having an OH number of >200 mg KOH/g, preferably of >250 mg KOH/g and more preferably of >300 mg KOH/g are obtained. It is also additionally possible to add small amounts (1 to 500 ppm) of other organic or inorganic acids to component A) prior to the addition of the DMC catalyst, as described, for example, in WO 99/14258. The reaction of component A) in step ii) with one or more alkylene oxides B1) under DMC catalysis can in principle be effected in the same reactor as the preparation of component A) in steps i-1) and i-2). The DMC catalysts concentration calculated based on the amount of polyoxyalkylene polyol 1) is in the range from 20 to 1000 ppm, preferably in the range from 30 to 400 ppm and more preferably in the range from 30 to 200 ppm.

DMC catalysts suitable for the process of the invention are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700949, EP-A 743093, EP-A 761708, WO 97/40086, WO 98/16310 and WO 00/47649, have a very high activity in the polymerization of alkylene oxides and enable the preparation of polyoxyalkylene polyols under optimal conditions at very low catalyst concentrations (100 ppm or less), such that removal of the catalyst from the finished product is generally no longer required. A typical example is that of the highly active DMC catalysts which are described in EP-A 700949 and contain not only a double metal cyanide compound (e.g. zinc hexacyanocobaltate(III)) and an organic complex ligand (e.g. tert-butanol) but also a polyoxyalkylene compound having a number-average molecular weight >500 g/mol. It is also possible to use the alkaline DMC catalysts disclosed in EP application number 10163170.3.

Cyanide-free metal salts suitable for preparation of the double metal cyanide compounds preferably have the general formula (III)

$$M(X)_n \quad \text{(III)}$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate, n is 1 when X=sulfate, carbonate or oxalate and n is 2 when X=halide, hydroxide, cyanate, thiocyanate, isocyanate, isothiocyanate or nitrate, or suitable cyanide-free metal salts have the general formula (IV)

$$M_r(X)_3 \quad \text{(IV)}$$

where

M is selected from the metal cations $Fe^{3+}$, $Al^{3+}$ and $Cr^{3+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate, r is 2 when X=sulfate, carbonate or oxalates and r is 1 when X=halide, hydroxide, cyanate, thiocyanate, isocyanate, isothiocyanate, carboxylate or nitrate, or suitable cyanide-free metal salts have the general formula (V)

$$M(X)_s \quad \text{(V)}$$

where

M is selected from the metal cations $Mo^{4+}$, $V^{4+}$ and $W^{4+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate, s is 2 when X=sulfate, carbonate or oxalate and s is 4 when X=halide, hydroxide, cyanate, thiocyanate, isocyanate, isothiocyanate, carboxylate or nitrate, or suitable cyanide-free metal salts have the general formula (VI)

$$M(X)_t \quad \text{(VI)}$$

where

M is selected from the metal cations $Mo^{6+}$ and $W^{6+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate, t is 3 when X=sulfate, carbonate or oxalate and t is 6 when X=halide, hydroxide, cyanate, thiocyanate, isocyanate, isothiocyanate, carboxylate or nitrate, Examples of suitable cyanide-free metal salts are zinc chloride, zinc bromide, zinc iodide, zinc acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VII)

$$(Y)_a M'(CN)_b (A)_c \quad \text{(VII)}$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, the values for a, b and c being selected so as to assure electronic neutrality of the metal cyanide salt; a is preferably 1, 2, 3 or 4; b is preferably 4, 5 or 6; c preferably has the value 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the inventive DMC catalysts are compounds of the general formula (VIII)

$$M_x[M'_{x'}(CN)_y]_z \quad \text{(VIII)},$$

in which M is defined as in formula (III) to (VI) and

M' is as defined in formula (VII), and x, x', y and z are integers and are chosen so as to give an electronically neutral double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S.

Pat. Nos. 3,404,109, 3,829,505, 3,941,849, EP-A 700949, EP-A 761708, JP-A 4145123, U.S. Pat. No. 5,470,813, EP-A 743 093 and WO-A 97/40086. For example, organic complex ligands used are water-soluble organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, in the preparation of the DMC catalysts of the invention, one or more complex-forming component(s) from the compound classes of the polyoxyalkylene compounds, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkylacrylates, polyalkylmethacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, bile acids or the salts, esters or amides thereof, cyclodextrins, phosphorus compounds, $\alpha,\beta$-unsaturated carboxylic esters or ionic surface- or interface-active compounds are used.

Preferably, in the preparation of the DMC catalysts of the invention, in the first step, the aqueous solutions of the metal salt (e.g. zinc chloride), used in a stoichiometric excess (at least 50 mol %) based on metal cyanide salt (i.e. at least a molar ratio of cyanide-free metal salt to metal cyanide salt of 2.25:1.00), and of the metal cyanide salt (e.g. potassium hexacyanocobaltate) are converted in the presence of the organic complex ligand (e.g. tert-butanol), such that a suspension containing the double metal cyanide compound (e.g. zinc hexacyanocobaltate), water, excess cyanide-free metal salt and the organic complex ligand is formed. This organic complex ligand may be present in the aqueous solution of the cyanide-free metal salt and/or of the metal cyanide salt, or it is added directly to the suspension obtained after precipitation of the double metal cyanide compound. It has been found to be advantageous to mix the aqueous solutions of the cyanide-free metal salt and of the metal cyanide salt and the organic complex ligands by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser as described in WO-A 01/39883.

In the second step, the solids (i.e. the precursor of the catalyst of the invention) are isolated from the suspension by known techniques, such as centrifugation or filtration.

In a preferred variant for preparing the catalyst, the isolated solids are subsequently washed in a third process step with an aqueous solution of the organic complex ligand (for example by resuspension and subsequent reisolation by filtration or centrifugation). Water-soluble by-products for example, such as potassium chloride, can be removed from the catalyst of the invention in this way. Preferably, the amount of the organic complex ligand in the aqueous wash solution is between 40% and 80% by mass, based on the overall solution.

Optionally, in the third step, the aqueous wash solution is admixed with one or more further complex-forming component(s), preferably in the range between 0.5% and 5% by mass, based on the overall solution.

It is also advantageous to wash the isolated solids more than once. For this purpose, for example, the first washing procedure can be repeated. However, it is preferable to use non-aqueous solutions for further washing operations, for example a mixture of organic complex ligand and further complex-forming component.

The isolated and optionally washed solid is subsequently dried at temperatures of generally 20-100° C. and at absolute pressures of generally 0.1 mbar to atmospheric pressure (1013 mbar), optionally after pulverizing.

A preferred process for isolation of the DMC catalysts of the invention from the suspension by filtration, filtercake washing and drying is described in WO-A 01/80994.

The DMC-catalyzed reaction step ii) can generally be conducted by the same chemical engineering principles as the preparation of the precursor of component A) in step i-1) that has been effected under basic catalysis. Some chemical engineering peculiarities of the DMC-catalyzed reaction step ii) are to be addressed hereinafter.

In a preferred procedure, the reactor contents are first stripped with inert gas (nitrogen or a noble gas, for example argon) at temperatures $T_S$ of 60 to 145° C., more preferably at temperatures of 90 to 135° C., most preferably at temperatures of 100 to 130° C., while stirring over a period of preferably 10 to 60 min. In the course of this, volatile constituents are removed with introduction of inert gases into the liquid phase with simultaneous application of reduced pressure, at an absolute pressure of 5 to 500 mbar. The temperature can subsequently be adjusted to the reaction temperature of the downstream step, for example the activation step and/or alkylene oxide addition step, provided that it is not identical to the stripping temperature. The ultimate reaction temperature can alternatively be established only in the initial phase of the alkylene oxide metering, for example with exploitation of the heat of reaction released.

In a process step preceding the actual polymerization (alkylene oxide addition), the DMC catalyst can first be activated separately by adding typically 2% to 20% by mass of alkylene oxide, based on the amount of component A) used in step ii). The addition of the at least one alkylene oxide can take place before, during or after the heating of the reactor contents to the stripping or reaction temperature; it preferably follows the stripping. After the metered addition of alkylene oxide has been stopped once typically 2% to 20% by mass of the at least one alkylene oxide, based on component A) used in step ii), have been added, the activation of the DMC catalyst is manifested by an accelerated drop in the reactor pressure, which indicates the commencement of alkylene oxide conversion. Then, i.e. on completion of activation, the remaining portion of the total amount of the at least one alkylene oxide B2) to be supplied for preparation of the polyoxyalkylene polyol (1) desired is supplied to the reaction mixture. In many cases, the catalyst is activated so quickly that the interruption of the metered addition of alkylene oxide can be dispensed with and the continuous metered addition of one alkylene oxide or two or more alkylene oxides B2) can be commenced directly.

The reaction temperature $T_R$ to be chosen in step ii) can be varied during the alkylene oxide metering phase. In the context of claim 1, $T_R$ is understood to mean the average of the temperature that exists in the reacting liquid over time during the alkylene oxide metering phase. It may be found to be advantageous to vary the reaction temperature, for example to raise it toward the end of the alkylene oxide metering phase in order to achieve an acceleration of the alkylene oxide conversion in the last phase of the alkylene oxide metering and in the further reaction phase. Typically, the reaction temperature $T_R$ remains constant during the alkylene oxide metering phase. In step ii), reaction temperatures $T_R$ preferably in the range from 80 to 200° C., but more preferably from 100 to 160° C., are chosen. "Alkylene oxide metering phase" is understood to mean the phase(s) in step ii) in which alkylene oxide is metered into the reactor. Thus, the alkylene oxide metering phase also includes an activation step preceding the actual main addition phase, as described in the preceding paragraph. In the context of claim 1, the alkylene oxide metering rate $A_R$ is understood to mean the average percentage of the total mass of alkylene oxides to be metered in per hour in step ii).

It is also preferable that the ratio of the calculated OH number of the polyoxyalkylene polymer A1) ($OHN_{A1}$) to the reaction temperature $T_R$ in step ii) satisfies the following inequation (IX):

$$OHN_{A1}/T_R < 6.3 \text{ [mg KOH/(g*° C.)]} \quad \text{(IX)}$$

In step ii), the at least one alkylene oxide B2 can likewise be supplied to the reactor in different ways in the DMC-catalyzed reaction step: one option is metered addition into the gas phase or directly into the liquid phase, for example via an immersed tube or a distributor ring close to the reactor base in a zone with good mixing. In the case of DMC-catalyzed processes, metered addition in the liquid phase is the preferred variant.

The end of the metered addition of alkylene oxide or a change in the composition of the alkylene oxide mixture metered in may be followed by further reaction phases, or there may be intervening further reaction phases, in which the decrease in the concentration of unreacted alkylene oxide can be quantified by monitoring the pressure. It is optionally possible to completely free the reaction mixture, after the last further reaction phase has ended, of small amounts of unconverted alkylene oxides under reduced pressure, for example at an absolute pressure of 1 to 500 mbar, or by stripping. Stripping removes volatile constituents, for example (residual) alkylene oxides, with introduction of inert gases and/or steam into the liquid phase with simultaneous application of reduced pressure (for example by passing inert gas through at an absolute pressure of 5 to 500 mbar). The removal of volatile constituents, for example of unconverted alkylene oxides, either under reduced pressure or by stripping, is generally effected at temperatures of 20 to 200° C., preferably at 50 to 160° C., and preferably at reaction temperature with stirring. Such stripping operations can also be performed in what are called stripping columns, in which an inert gas or steam stream is passed counter to the product stream. Preference is given to using stripping columns having random packings or internals for this purpose. Such stripping operations can also be conducted continuously by, for example, collecting the unstripped material in a buffer vessel and feeding it continuously to the stripping column therefrom. On attainment of constant pressure in the further reaction phase and optionally after removing volatile constituents by means of reduced pressure and/or stripping, the product can be discharged from the reactor.

It is optionally possible to add ageing stabilizers, for example antioxidants, to the polyoxyalkylene polyols prepared by the process of the invention.

Preferably, the DMC catalyst remains in the end product (1), but it can also be removed, for example by treatment with adsorbents. Processes for removing DMC catalysts are described, for example, in U.S. Pat. No. 4,987,271, DE-A 3132258, EP-A 406440, U.S. Pat. Nos. 5,391,722, 5,099,075, 4,721,818, 4,877,906 and EP-A 385619.

The at least one alkylene oxide B2) that has been converted under DMC catalysis in step ii) has 2 to 24 carbon atoms. The alkylene oxides having 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, and 3-glycidyloxypropyltriisopropoxysilane.

Further monomers copolymerizable with alkylene oxides under DMC catalysis in step ii) by the process of the invention are, for example, aliphatic lactones, aromatic lactones, lactides, cyclic carbonates having preferably at least three optionally substituted methylene groups between the oxygen atoms of the carbonate group, aliphatic cyclic anhydrides, aromatic cyclic anhydrides and carbon dioxide.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H- pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, and 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention, cyclic carbonates having fewer than three optionally substituted methylene groups between the oxygen atoms of the carbonate group are incorporated into the polymer chain not at all or only to a small extent.

Cyclic anhydrides are cyclic compounds containing an anhydride group in the ring. Preferred compounds are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

Their use is also described in U.S. Pat. Nos. 3,538,043, 4,500,704, 5,032,671, 6,646,100, EP-A 222453 and WO-A 2008/013731.

By the process of the invention, it is possible to alter the composition of the alkylene oxide mixture not just within one of the two reaction steps but also at the changeover from the base-catalyzed alkylene oxide addition step (steps i-1) and i-2)) to the DMC-catalyzed alkylene oxide addition step (step ii)).

In the process of the invention, in step ii), the alkylene oxide B2) used is preferably ethylene oxide, propylene oxide or a mixture of ethylene oxide and propylene oxide. If mixtures of ethylene oxide and propylene oxide are used, these preferably have up to 50% by mass of ethylene oxide and more preferably up to 30% by mass of ethylene oxide, based on the total mass of the mixture of ethylene oxide and propylene oxide. Very particular preference is given to using exclusively propylene oxide. If different alkylene oxides B2) are used during the DMC-catalyzed alkylene oxide addition step ii), these may again be metered in either as a mixture or in succession. In the latter mode of metered addition, the polyoxyalkylene chains that continue to grow under DMC catalysis adopt block structures. Often metered in as the end block is pure ethylene oxide or mixtures of propylene oxide and ethylene oxide with a high ethylene oxide content, such that the polyoxyalkylene polyols prepared have 40% to 100% primary OH groups.

In the metered addition of two or more alkylene oxides, it is possible to change the composition of the alkylene oxide stream supplied continuously or instantaneously.

In a further embodiment of the process of the invention, the molar mass of the polyoxyalkylene polyol 1) which is obtained in step ii) is at least 44 g/mol, preferably at least 58 g/mol and most preferably at least 88 g/mol higher than the molar mass of the polyoxyalkylene A1) which is obtained in step i).

The polyoxyalkylene polyols 1), alone or optionally in a mixture, can be reacted with organic polyisocyanates with further isocyanate-reactive components, optionally in the presence of blowing agents, in the presence of catalysts and optionally together with further additives, for example cell stabilizers, and as such serve as components of solid or foamed polyurethanes, for example flexible polyurethane foam, especially slabstock flexible polyurethane foam and molded flexible polyurethane foam.

The invention likewise provides polyurethanes, preferably solid or foamed polyurethanes, especially flexible polyurethane foams, for example slabstock flexible polyurethane foams and molded flexible polyurethane foams, comprising the polyoxyalkylene polyols 1) of the invention.

EXAMPLES

General Remarks:
Pressures should fundamentally be understood as absolute pressures. Unless stated otherwise, percentages should be understood as percentages by weight.
Methods:
OH Number and Viscosity
OH numbers were determined according to the method of DIN 53240. Viscosities were determined by means of a rotary viscometer (Physica MCR 51, manufacturer: Anton Paar) by the method of DIN 53018.
Determination of Potassium Content
Potassium content was determined via optical emission spectroscopy (ICP-OES).

Determination of Reaction Temperature $T_R$

The reaction temperature $T_R$ was determined by means of a thermocouple present in the base region of the reactor used. Reaction temperature $T_R$ is understood to mean the temperature of the reacting liquid.

Raw Materials Used

Catalyst for Alkylene Oxide Addition (DMC Catalyst):

double metal cyanide catalyst, containing zinc hexacyanocobaltate, tert-butanol and polypropylene glycol having a number-average molecular weight of 1000 g/mol; described in WO-A 01/80994, example 6.

IRGANOX® 1076:

octadecyl 3-(3,5-di-tert-butyl-4-hydroxyphenyl)propionate. (BASF SE)

Example 1

A 2 L laboratory autoclave was charged under a nitrogen atmosphere with 382.8 g of trimethylolpropane (TMP) and 0.204 g of a 44.81% solution of KOH in water. The autoclave was closed and the pressure was lowered to about 100 mbar while stirring (crossbeam stirrer, 800 rpm). During the heating to the reaction temperature of 150° C., the pressure increased to 320 mbar. At 150° C., over a period of 2.7 h and at a stirrer speed of 800 rpm, 267.3 g of propylene oxide were metered into the autoclave. After a further reaction time of 2.0 h, the reactor contents were heated at 150° C. under reduced pressure at a pressure of 10 mbar over a period of 30 min. The calculated OH number of this polyoxyalkylene polyol A1 was 739 mg KOH/g. The reactor contents were cooled down to 80° C., and 1.315 g of a 12.33% aqueous sulfuric acid solution were added. After a stirring time of 1 h at 80° C., the reactor contents were left to cool down to room temperature.

0.063 g of DMC catalyst was added and the contents of the autoclave were stripped at 130° C. at 200 rpm under reduced pressure at a pressure of 100 to 120 mbar with introduction of 50 mL of nitrogen per minute via a distributor ring beneath the liquid level for 30 min. Then, likewise at 130° C. but with stirring at 800 rpm, 550.1 g of propylene oxide were metered into the headspace of the autoclave over a period of 3.96 h. The metered addition of propylene oxide commenced at a pressure of 0.05 bar. A further reaction time of 0.42 h was followed by devolatilization at 130° C. at an absolute pressure of 1 mbar for 0.5 h, then cooling to 80° C. and addition of 0.612 g of IRGANOX® 1076. The OH number of the product was 391 mg KOH/g and viscosity, at 25° C., was 777 mPas. Further relevant data are given in table 1.

Example 2

A 2 L laboratory autoclave was charged under a nitrogen atmosphere with 333.0 g of glycerol and 0.230 g of a 46.44% solution of KOH in water. The autoclave was closed and the pressure was lowered to about 50 mbar while stirring (crossbeam stirrer, 800 rpm). During the heating to the reaction temperature of 150° C., the pressure increased to 130 mbar. At 150° C., over a period of 6.83 h and at a stirrer speed of 800 rpm, 675.4 g of propylene oxide were metered into the autoclave. After a further reaction time of 7.0 h, the reactor contents were heated at 150° C. under reduced pressure at a pressure of 10 mbar over a period of 30 min. The calculated OH number of this polyoxyalkylene polyol A1 was 600 mg KOH/g. The reactor contents were cooled down to 80° C., and 1.566 g of a 12.05% aqueous sulfuric acid solution were added. After a stirring time of 1 h at 80° C., the reactor contents were left to cool down to room temperature.

0.078 g of DMC catalyst was added and the contents of the autoclave were stripped at 130° C. at 200 rpm under reduced pressure at a pressure of about 180 mbar with introduction of 50 mL of nitrogen per minute via a distributor ring beneath the liquid level for 30 min. Then, likewise at 130° C. but with stirring at 800 rpm, 513.5 g of propylene oxide were metered into the headspace of the autoclave over a period of 2.16 h. The metered addition of propylene oxide commenced at a pressure of 0.05 bar. A further reaction time of 0.38 h was followed by devolatilization at 130° C. at an absolute pressure of 1 mbar for 0.5 h, then cooling to 80° C. and addition of 0.747 g of IRGANOX® 1076. The OH number of the product was 392 mg KOH/g and viscosity, at 25° C., was 381 mPas. Further relevant data are given in table 1.

Example 3

A 2 L laboratory autoclave was charged under a nitrogen atmosphere with 290.7 g of a 70% solution of sorbitol in water, 87.7 g of glycerol and 0.265 g of a 46.72% solution of KOH in water. The autoclave was closed, the temperature was increased to 115° C. while stirring (crossbeam stirrer, 800 rpm), and the pressure was lowered to about 50 mbar. After about 15 min, while continuing to run the vacuum pump, introduction of 50 mL of nitrogen per minute through a distributor ring lying below the liquid level was commenced, which increased the pressure to about 200 mbar. After 3 h, the introduction of nitrogen was stopped and, after a brief vacuum phase, the mixture was heated to reaction temperature (150° C.). In the course of this, a pressure of 80 mbar was attained. At 150° C., over a period of 6.03 h and at a stirrer speed of 800 rpm, 602.8 g of propylene oxide were metered into the autoclave. After a further reaction time of 7.0 h, the reactor contents were heated at 150° C. under reduced pressure at a pressure of 10 mbar over a period of 30 min. The calculated OH number of this polyoxyalkylene polyol A1 was 600 mg KOH/g. The reactor contents were cooled down to 80° C., and 1.863 g of a 11.83% aqueous sulfuric acid solution were added. After a stirring time of 1 h at 80° C., the reactor contents were left to cool down to room temperature.

0.123 g of DMC catalyst was added and the contents of the autoclave were stripped at 130° C. at 200 rpm under reduced pressure at a pressure of about 190 mbar with introduction of 50 mL of nitrogen per minute via the distributor ring beneath the liquid level for 30 min. Then, likewise at 130° C. but with stirring at 800 rpm, 301.6 g of propylene oxide were metered into the headspace of the autoclave over a period of 3 h. The metered addition of propylene oxide commenced at a pressure of 0.05 bar. A further reaction time of 0.33 h was followed by devolatilization at 130° C. at an absolute pressure of 1 mbar for 0.5 h, then cooling to 80° C. and addition of 0.608 g of IRGANOX® 1076. The OH number of the product was 425 mg KOH/g and viscosity, at 25° C., was 5155 mPas. Further relevant data are given in table 1.

Example 4

A 2 L laboratory autoclave was charged under a nitrogen atmosphere with 382.7 g of TMP and 0.191 g of a 46.44% solution of KOH in water. The autoclave was closed and the pressure was lowered to about 100 mbar while stirring (crossbeam stirrer, 800 rpm). During the heating to the reaction temperature of 150° C., the pressure increased to 180 mbar. At 150° C., over a period of 4.2 h and at a stirrer speed of 800 rpm, 417.3 g of propylene oxide were metered into the autoclave. After a further reaction time of 6.5 h, the reactor contents were heated at 150° C. under reduced pressure at a pressure of 10 mbar over a period of 30 min. The calculated OH number of this polyoxyalkylene polyol A1 was 600 mg KOH/g. The reactor contents were cooled down to 80° C., and 1.287 g of a 12.14% aqueous sulfuric acid solution were added. After a stirring time of 1 h at 90° C., the reactor contents were left to cool down to room temperature.

0.066 g of DMC catalyst was added and the contents of the autoclave were stripped at 130° C. at 200 rpm under reduced pressure at a pressure of 100 to 130 mbar with introduction of 50 mL of nitrogen per minute via a distributor ring beneath the liquid level for 30 min. Then, likewise at 130° C. but with stirring at 800 rpm, 400.0 g of propylene oxide were metered into the headspace of the autoclave over a period of 2.07 h. The metered addition of propylene oxide commenced at a pressure of 0.04 bar. A further reaction time of 0.33 h was followed by devolatilization at 130° C. at an absolute pressure of 1 mbar for 0.5 h, then cooling to 80° C. and addition of 0.603 g of IRGANOX® 1076. The OH number of the product was 391 mg KOH/g and viscosity, at 25° C., was 756 mPas. Further relevant data are given in table 1.

Example 5

A 2 L laboratory autoclave was charged under a nitrogen atmosphere with 382.7 g of TMP and 0.181 g of a 44.81% solution of KOH in water. The autoclave was closed and the pressure was lowered to about 70 mbar while stirring (crossbeam stirrer, 800 rpm). During the heating to the reaction temperature of 150° C., the pressure increased to 100 mbar. At 150° C., over a period of 1.02 h and at a stirrer speed of 800 rpm, 189.1 g of propylene oxide were metered into the autoclave. After a further reaction time of 3.0 h, the reactor contents were heated at 150° C. under reduced pressure at a pressure of 10 mbar over a period of 30 min. The calculated OH number of this polyoxyalkylene polyol A1 was 840 mg KOH/g. The reactor contents were cooled down to 80° C., and 1.206 g of a 12.07% aqueous sulfuric acid solution were added. After a stirring time of 1 h at 80° C., the reactor contents were left to cool down to room temperature.

0.064 g of DMC catalyst was added and the contents of the autoclave were stripped at 130° C. at 200 rpm under reduced pressure at a pressure of 190 mbar with introduction of 50 mL of nitrogen per minute via a distributor ring beneath the liquid level for 30 min. Then the mixture was heated to 140° C., 628.3 g of propylene oxide were metered into the headspace of the autoclave at this temperature and while stirring at 800 rpm over a period of 4.02 h. The metered addition of propylene oxide commenced at a pressure of 0.05 bar. A further reaction time of 0.88 h was followed by devolatilization at 140° C. at an absolute pressure of 1 mbar for 0.5 h, then cooling to 80° C. and addition of 0.601 g of IRGANOX® 1076. The OH number of the product was 393 mg KOH/g and viscosity, at 25° C., was 767 mPas. Further relevant data are given in table 1.

Example 6

A 2 L laboratory autoclave was charged under a nitrogen atmosphere with 383.2 g of TMP and 0.194 g of a 44.81% solution of KOH in water. The autoclave was closed and the pressure was lowered to about 60 mbar while stirring (crossbeam stirrer, 800 rpm). During the heating to the reaction temperature of 150° C., the pressure increased to 110 mbar. At 150° C., over a period of 1.02 h and at a stirrer speed of 800 rpm, 189.1 g of propylene oxide were metered into the autoclave. After a further reaction time of 3.32 h, the reactor contents were heated at 150° C. under reduced pressure at a pressure of 10 mbar over a period of 30 min. The calculated OH number of this polyoxyalkylene polyol A1 was 840 mg KOH/g. The reactor contents were cooled down to 80° C., and 1.288 g of a 12.07% aqueous sulfuric acid solution were added. After a stirring time of 1 h at 80° C., the reactor contents were left to cool down to room temperature.

0.073 g of DMC catalyst was added and the contents of the autoclave were stripped at 130° C. at 200 rpm under reduced pressure at a pressure of 190 mbar with introduction of 50 mL of nitrogen per minute via a distributor ring beneath the liquid level for 30 min. Then the mixture was heated to 150° C., 628.3 g of propylene oxide were metered into the headspace of the autoclave at this temperature and while stirring at 800 rpm over a period of 0.9 h. The metered addition of propylene oxide commenced at a pressure of 0.08 bar. A further reaction time of 0.88 h was followed by devolatilization at 150° C. at an absolute pressure of 1 mbar for 0.5 h, then cooling to 80° C. and addition of 0.603 g of IRGANOX® 1076. The OH number of the product was 394 mg KOH/g and viscosity, at 25° C., was 776 mPas. Further relevant data are given in table 1.

Example 7

A 2 L laboratory autoclave was charged under a nitrogen atmosphere with 241.5 g of ethylene glycol, 215.8 g of sucrose and 0.257 g of a 46.72% solution of KOH in water. The autoclave was closed and the pressure was lowered to about 130 mbar while stirring (crossbeam stirrer, 800 rpm). During the heating to the reaction temperature of 120° C., the pressure increased to 370 mbar. At 120° C., over a period of 7.45 h and at a stirrer speed of 800 rpm, 742.7 g of propylene oxide were metered into the autoclave. After a further reaction time of 9 h, the reactor contents were heated at 120° C. under reduced pressure at a pressure of 10 mbar over a period of 30 min. The calculated OH number of this polyoxyalkylene polyol A1 was 600 mg KOH/g. The reactor contents were cooled down to 80° C., and 1.794 g of a 11.83% aqueous sulfuric acid solution were added. After a stirring time of 1 h at 90° C., the mixture was heated to 110° C. for a period of 3 h, and the water introduced via the aqueous sulfuric acid solution was removed under reduced pressure (60 mbar). Thereafter, the reactive contents were left to cool down to room temperature and the intermediate was discharged.

880.1 g of the intermediate thus prepared were introduced into a 2 L laboratory autoclave under a nitrogen atmosphere. 0.039 g of 85% aqueous phosphoric acid solution and 0.122 g of DMC catalyst were added and the contents of the autoclave were stripped at 130° C. at 200 rpm under reduced pressure at a pressure of 180 mbar with introduction of 50 mL of nitrogen per minute via a distributor ring beneath the liquid level for 30 min. At a temperature of 130° C. and while stirring at 800 rpm, 320 g of propylene oxide were metered into the headspace of the autoclave at this temperature and while stirring at 800 rpm over a period of 3.08 h. The metered addition of propylene oxide commenced at a pressure of 0.05 bar. A further reaction time of 3.15 h was followed by devolatilization at 130° C. at an absolute pressure of 1 mbar for 0.5 h, then cooling to 80° C. and addition of 0.638 g of IRGANOX® 1076. The OH number of the product was 431 mg KOH/g and viscosity, at 25° C., was 403 mPas. Further relevant data are given in table 1.

Example 8

A 2 L laboratory autoclave was charged under a nitrogen atmosphere with 382.9 g of TMP and 0.209 g of a 44.81% solution of KOH in water. The autoclave was closed and the pressure was lowered to about 70 mbar while stirring (crossbeam stirrer, 800 rpm). During the heating to the reaction temperature of 150° C., the pressure increased to 140 mbar. At 150° C., over a period of 1.0 h and at a stirrer speed of 800 rpm, a mixture of 132.3 g of propylene oxide and 56.2 g of ethylene oxide was metered into the autoclave. After a further reaction time of 2.0 h, the reactor contents were heated at 150° C. under reduced pressure at a pressure of 10 mbar over a period of 30 min. The calculated OH number of this polyoxyalkylene polyol A1 was 840.5 mg KOH/g. The reactor contents were cooled down to 80° C., and 1.432 g of a 11.645% aqueous sulfuric acid solution were added. After a stirring time of 1 h at 80° C., the reactor contents were left to cool down to room temperature.

0.184 g of DMC catalyst was added and the contents of the autoclave were stripped at 130° C. at 200 rpm under reduced pressure at a pressure of 190 mbar with introduction of 50 mL of nitrogen per minute via a distributor ring beneath the liquid level for 30 min. Then the mixture was heated to 140° C., a mixture of 439.8 g of propylene oxide and 188.2 g of ethylene oxide were metered into the headspace of the autoclave at this temperature and while stirring at 800 rpm over a period of 3.97 h. The metered addition of alkylene oxide commenced at a pressure of 0.06 bar. A further reaction time of 0.33 h was followed by devolatilization at 140° C. at an absolute pressure of 1 mbar for 0.5 h, then cooling to 80° C. and addition of 0.605 g of IRGANOX® 1076. The OH number of the product was 382 mg KOH/g and viscosity, at 25° C., was 501 mPas. Further relevant data are given in table 1.

Example 9

A 2 L laboratory autoclave was charged under a nitrogen atmosphere with 382.8 g of TMP and 0.212 g of a 46.44% solution of KOH in water. The autoclave was closed and the pressure was lowered to about 50 mbar while stirring (crossbeam stirrer, 800 rpm). During the heating to the reaction temperature of 150° C., the pressure increased to 130 mbar. At 150° C., over a period of 1.95 h and at a stirrer speed of 800 rpm, a mixture of 208.7 g of propylene oxide and 208.7 g of ethylene oxide was metered into the autoclave. After a further reaction time of 2.3 h, the reactor contents were heated at 150° C. under reduced pressure at a pressure of 10 mbar over a period of 30 min. The calculated OH number of this polyoxyalkylene polyol A1 was 600 mg KOH/g. The reactor contents were cooled down to 80° C., and 1.456 g of a 11.645% aqueous sulfuric acid solution were added. After a stirring time of 1 h at 80° C., the reactor contents were left to cool down to room temperature.

0.184 g of DMC catalyst was added and the contents of the autoclave were stripped at 130° C. at 200 rpm under reduced pressure at a pressure of 150 mbar with introduction of 50 mL of nitrogen per minute via a distributor ring beneath the liquid level for 30 min. Then the mixture was heated to 140° C., a mixture of 200.0 g of propylene oxide and 199.4 g of ethylene oxide were metered into the headspace of the autoclave at this temperature and while stirring at 800 rpm over a period of 3.98 h. The metered addition of alkylene oxide commenced at a pressure of 0.05 bar. A further reaction time of 0.33 h was followed by devolatilization at 140° C. at an absolute pressure of 1 mbar for 0.5 h, then cooling to 80° C. and addition of 0.603 g of IRGANOX® 1076. The OH number of the product was 384 mg KOH/g and viscosity, at 25° C., was 399 mPas. Further relevant data are given in table 1.

Example 10

A 10 L laboratory autoclave was charged under a nitrogen atmosphere with 1969.8 g of glycerol and 1.322 g of a 46.49% solution of KOH in water. The autoclave was closed and the pressure was lowered to about 30 mbar while stirring (gate stirrer, 450 rpm). After heating to 150° C., over a period of 6.8 h and at a stirrer speed of 450 rpm, 4030.7 g of propylene oxide were metered into the autoclave. After a further reaction time of 6.5 h, the reactor contents were heated at 150° C. under reduced pressure at a pressure of 30 mbar over a period of 30 min. The calculated OH number of this polyoxyalkylene polyol A1 was 600 mg KOH/g. The reactor contents were cooled down to 80° C., and 5.435 g of a 20.35% aqueous perchloric acid solution were added. After a stirring time of 1 h at 80° C., the mixture was heated to 110° C. for a period of 3 h, and the water introduced via the aqueous perchloric acid solution was removed under reduced pressure (60 mbar). Thereafter, the reactive contents were left to cool down to room temperature and the intermediate was discharged.

500.1 g of the intermediate thus prepared were introduced into a 10 L laboratory autoclave under a nitrogen atmosphere. 0.077 g of DMC catalyst was added and the contents of the autoclave were stripped at 130° C. at 130 rpm (gate stirrer) under reduced pressure at a pressure of 160 mbar with introduction of 50 mL of nitrogen per minute via a distributor ring beneath the liquid level for 30 min. At a temperature of 130° C. and while stirring at 450 rpm, 235.1 g of propylene oxide were metered into the headspace of the autoclave over a period of 2.03 h. The metered addition of propylene oxide commenced at a pressure of 0.05 bar. A further reaction time of 0.92 h was followed by devolatilization at 130° C. at an absolute pressure of 50 mbar for 0.5 h, then cooling to 80° C. and addition of 0.399 g of IRGANOX® 1076. The OH number of the product was 402 mg KOH/g and viscosity, at 25° C., was 393 mPas. Further relevant data are given in table 1.

Example 11

A 2 L laboratory autoclave was charged under a nitrogen atmosphere with 574.1 g of TMP and 0.271 g of a 46.44% solution of KOH in water. The autoclave was closed and the pressure was lowered to about 70 mbar while stirring (crossbeam stirrer, 800 rpm). During the heating to the reaction temperature of 150° C., the pressure increased to 150 mbar. At 150° C., over a period of 5.1 h and at a stirrer speed of 800 rpm, 626.0 g of propylene oxide were metered into the autoclave. After a further reaction time of 7 h, the reactor contents were heated at 150° C. under reduced pressure at a pressure of 50 mbar over a period of 30 min. The calculated OH number of this polyoxyalkylene polyol A1 was 600 mg KOH/g. The reactor contents were cooled down to 80° C., and 1.121 g of a 20.35% aqueous perchloric acid solution were added. After a stirring time of 1 h at 80°

C., the mixture was heated to 110° C. for a period of 3 h, and the water introduced via the aqueous perchloric acid solution was removed under reduced pressure (160 mbar). Thereafter, the reactive contents were left to cool down to room temperature and the intermediate was discharged.

500.0 g of the intermediate thus prepared were introduced into a 2 L laboratory autoclave under a nitrogen atmosphere. 0.079 g of DMC catalyst was added and the contents of the autoclave were stripped at 130° C. at 200 rpm (crossbeam stirrer) under reduced pressure at a pressure of 160 mbar with introduction of 50 mL of nitrogen per minute via a distributor ring beneath the liquid level for 30 min. At a temperature of 130° C. and while stirring at 800 rpm, 235.1 g of propylene oxide were metered into the headspace of the autoclave over a period of 2.03 h. The metered addition of propylene oxide commenced at a pressure of 0.04 bar. A further reaction time of 0.67 h was followed by devolatilization at 130° C. at an absolute pressure of 50 mbar for 0.5 h, then cooling to 80° C. and addition of 0.380 g of IRGANOX® 1076. The OH number of the product was 395 mg KOH/g and viscosity, at 25° C., was 745 mPas. Further relevant data are given in table 1.

Example 12

A 2 L laboratory autoclave was charged under a nitrogen atmosphere with 239.4 g of TMP and 0.114 g of a 44.81% solution of KOH in water. The autoclave was closed and the pressure was lowered to about 100 mbar while stirring (crossbeam stirrer, 800 rpm). During the heating to the reaction temperature of 150° C., the pressure increased to 210 mbar. At 150° C., over a period of 1.02 h and at a stirrer speed of 800 rpm, 118 g of propylene oxide were metered into the autoclave. After a further reaction time of 4.0 h, the reactor contents were heated at 150° C. under reduced pressure at a pressure of 10 mbar over a period of 30 min. The calculated OH number of this polyoxyalkylene polyol A1 was 840 mg KOH/g. The reactor contents were cooled down to 80° C., and 0.753 g of a 12.22% aqueous sulfuric acid solution were added. After a stirring time of 1 h at 80° C., the reactor contents were left to cool down to room temperature.

0.063 g of DMC catalyst was added and the contents of the autoclave were stripped at 130° C. at 200 rpm under reduced pressure at a pressure of 130 mbar with introduction of 50 mL of nitrogen per minute via a distributor ring beneath the liquid level for 30 min. Then the mixture was heated to 150° C., 843 g of propylene oxide were metered into the headspace of the autoclave at this temperature and while stirring at 800 rpm over a period of 2.02 h. The metered addition of propylene oxide commenced at a pressure of 0.08 bar. A further reaction time of 0.45 h was followed by devolatilization at 150° C. at an absolute pressure of 1 mbar for 0.5 h, then cooling to 80° C. and addition of 0.616 g of IRGANOX® 1076. The OH number of the product was 244 mg KOH/g and viscosity, at 25° C., was 413 mPas. Further relevant data are given in table 1.

Example 13

A 2 L laboratory autoclave was charged under a nitrogen atmosphere with 287.1 g of TMP and 0.135 g of a 44.81% solution of KOH in water. The autoclave was closed and the pressure was lowered to about 70 mbar while stirring (crossbeam stirrer, 800 rpm). During the heating to the reaction temperature of 150° C., the pressure increased to 140 mbar. At 150° C., over a period of 3.1 h and at a stirrer speed of 800 rpm, 313.0 g of propylene oxide were metered into the autoclave. After a further reaction time of 6.5 h, the reactor contents were heated at 150° C. under reduced pressure at a pressure of 10 mbar over a period of 30 min. The calculated OH number of this polyoxyalkylene polyol A1 was 600 mg KOH/g. The reactor contents were cooled down to 80° C., and 0.65 g of a 12.220% aqueous sulfuric acid solution were added. After a stirring time of 1 h at 80° C., the reactor contents were left to cool down to room temperature.

0.068 g of DMC catalyst was added and the contents of the autoclave were stripped at 130° C. at 200 rpm under reduced pressure at a pressure of 180 mbar with introduction of 50 mL of nitrogen per minute via a distributor ring beneath the liquid level for 30 min. While stirring at 800 rpm and likewise at 130° C., 600.1 g of propylene oxide were metered into the headspace of the autoclave over a period of 3.03 h. The metered addition of alkylene oxide commenced at a pressure of 0.07 bar. A further reaction time of 0.97 h was followed by devolatilization at 130° C. at an absolute pressure of 1 mbar for 0.5 h, then cooling to 80° C. and addition of 0.604 g of IRGANOX® 1076. The OH number of the product was 292 mg KOH/g and viscosity, at 25° C., was 477 mPas. Further relevant data are given in table 1.

Comparative Example V1

A 2 L laboratory autoclave was charged under a nitrogen atmosphere with 383.0 g of TMP and 0.185 g of a 44.81% solution of KOH in water. The autoclave was closed and the pressure was lowered to about 110 mbar while stirring (crossbeam stirrer, 800 rpm). During the heating to the reaction temperature of 150° C., the pressure increased to 150 mbar. At 150° C., over a period of 1.02 h and at a stirrer speed of 800 rpm, 189.1 g of propylene oxide were metered into the autoclave. After a further reaction time of 3.6 h, the reactor contents were heated at 150° C. under reduced pressure at a pressure of 50 mbar over a period of 30 min. The calculated OH number of this polyoxyalkylene polyol A1 was 840 mg KOH/g. The reactor contents were cooled down to 80° C., and 1.192 g of a 12.33% aqueous sulfuric acid solution were added. After a stirring time of 1 h at 80° C., the reactor contents were left to cool down to room temperature.

0.066 g of DMC catalyst was added and the contents of the autoclave were stripped at 130° C. at 200 rpm under reduced pressure at a pressure of 150 mbar with introduction of 50 mL of nitrogen per minute via a distributor ring beneath the liquid level for 30 min. Then the mixture was heated to 150° C., and an attempt was made to meter 628.3 g of propylene oxide into the headspace of the autoclave at this temperature and while stirring at 800 rpm over a period of 4.0 h. The metered addition of propylene oxide commenced at a pressure of 0.05 bar. After 311.5 g of propylene oxide had been metered in (metering time 2.0 h), the reaction was stopped because, after the catalyst had initially been activated, it was deactivated, which was manifested by a pressure rise to 3.4 bar. After a further reaction time of 5.5 h, the pressure had dropped merely to 2.79 bar. Large amounts of unreacted propylene oxide had to be removed under reduced pressure. Further relevant data are given in table 1.

Comparative Example V2

A 2 L laboratory autoclave was charged under a nitrogen atmosphere with 706.5 g of TMP and 8.139 g of a 44.81% solution of KOH in water. The autoclave was closed and the water introduced with the aqueous potassium hydroxide solution and the water formed by reaction were removed while stirring (crossbeam stirrer, 200 rpm) at 115° C. under reduced pressure at a pressure of 70 mbar over a period of 3 h. Thereafter, the temperature was raised to the reaction temperature of 150° C., and the pressure increased to 180 mbar. At 150° C., over a period of 1.75 h and at a stirrer speed of 800 rpm, 493.6 g of propylene oxide were metered into the autoclave. After a further reaction time of 0.5 h, the reactor contents were heated at 150° C. under reduced pressure at a pressure of 50 mbar over a period of 30 min. The calculated OH number of this polyoxyalkylene polyol A1 was 738 mg KOH/g. The reactor contents were cooled down to 80° C., and 120 g of water were added. Thereafter, 25.839 g of a 12.33% aqueous sulfuric acid solution were added. After a stirring time of 1 h at 80° C., the water was removed over a period of 3 h at 115° C. and a pressure of 1 mbar. At 80° C., 0.613 g of IRGANOX® 1076 was added and the mixture was stirred for 1 h. The precipitated potassium salt was subsequently removed by filtration through a depth filter (T 750, from Seitz). The residual potassium content was 9 ppm.

651.7 g of the intermediate thus prepared were introduced into a 2 L laboratory autoclave under a nitrogen atmosphere. 0.060 g of DMC catalyst was added and the contents of the autoclave were stripped at 130° C. at 200 rpm (crossbeam stirrer) under reduced pressure at a pressure of 220 mbar with introduction of 50 mL of nitrogen per minute via a distributor ring beneath the liquid level for 30 min. An attempt was made to meter 550 g of propylene oxide into the headspace of the autoclave at 130° C. and while stirring at 800 rpm over a period of 4.0 h. The metered addition of propylene oxide commenced at a pressure of 0.05 bar. After 127.2 g of propylene oxide had been metered in, the reaction was stopped because it was not possible to sufficiently activate the DMC catalyst, which was manifested by a steep pressure rise to 3.48 bar. Within a further reaction time of 1.5 h, there was virtually no drop in the pressure. Large amounts of unreacted propylene oxide had to be removed under reduced pressure. Further relevant data are given in table 1.

Comparative Example V3

A 2 L laboratory autoclave was charged under a nitrogen atmosphere with 383.7 g of TMP and 0.195 g of a 44.81% solution of KOH in water. The autoclave was closed and the pressure was lowered to about 40 mbar while stirring (crossbeam stirrer, 800 rpm). During the heating to the reaction temperature of 150° C., the pressure increased to 60 mbar. At 150° C., over a period of 1.02 h and at a stirrer speed of 800 rpm, 189.1 g of propylene oxide were metered into the autoclave. After a further reaction time of 3.0 h, the reactor contents were heated at 150° C. under reduced pressure at a pressure of 50 mbar over a period of 30 min. The calculated OH number of this polyoxyalkylene polyol A1 was 840 mg KOH/g. The reactor contents were cooled down to 80° C., and 1.254 g of a 12.33% aqueous sulfuric acid solution were added. After a stirring time of 1 h at 80° C., the reactor contents were left to cool down to room temperature.

0.066 g of DMC catalyst was added and the contents of the autoclave were stripped at 150° C. at 200 rpm under reduced pressure at a pressure of 220 mbar with introduction of 50 mL of nitrogen per minute via a distributor ring beneath the liquid level for 30 min. An attempt was then made to meter 628.3 g of propylene oxide into the headspace of the autoclave at this temperature and while stirring at 800 rpm over a period of 3.5 h. The metered addition of propylene oxide commenced at a pressure of 0.05 bar. After 256.2 g of propylene oxide had been metered in, the reaction was stopped because it was not possible to activate the DMC catalyst, which was manifested by a pressure rise to 5.3 bar. After a further reaction time of 4 h, the pressure had dropped merely to 5.0 bar. Large amounts of unreacted propylene oxide had to be removed under reduced pressure. Further relevant data are given in table 1.

Comparative Example V4

A 2 L laboratory autoclave was charged under a nitrogen atmosphere with 287.2 g of TMP and 0.134 g of a 44.81% solution of KOH in water. The autoclave was closed and the pressure was lowered to about 80 mbar while stirring (crossbeam stirrer, 800 rpm). During the heating to the reaction temperature of 150° C., the pressure increased to 160 mbar. At 150° C., over a period of 1.57 h and at a stirrer speed of 800 rpm, 313.1 g of propylene oxide were metered into the autoclave. After a further reaction time of 5.8 h, the reactor contents were heated at 150° C. under reduced pressure at a pressure of 80 mbar over a period of 30 min. The calculated OH number of this polyoxyalkylene polyol A1 was 600 mg KOH/g. The reactor contents were cooled down to 80° C., and 0.434 g of a 12.22% aqueous sulfuric acid solution were added. After a stirring time of 1 h at 80° C., the reactor contents were left to cool down to room temperature.

0.065 g of DMC catalyst was added and the contents of the autoclave were stripped at 130° C. at 200 rpm under reduced pressure at a pressure of 180 mbar with introduction of 50 mL of nitrogen per minute via a distributor ring beneath the liquid level for 30 min. An attempt was then made to meter 310.7 g of propylene oxide into the headspace of the autoclave at this temperature and while stirring at 800 rpm over a period of 3.0 h. The metered addition of propylene oxide commenced at a pressure of 0.07 bar. After 250 g of propylene oxide had been metered in over a period of 1.25 h, the reaction was stopped because it was not possible to activate the DMC catalyst, which was manifested by a pressure rise to 5.5 bar. After a further reaction time of 2 h, the pressure had dropped to 4.2 bar, but it was not possible to recognize the pressure profile typical of the activation of the DMC catalyst (accelerated pressure drop). Then a second portion of 61 g of propylene oxide was metered in over a period of 0.28 h. In the course of this, the pressure rose again to 5.5 bar. In the subsequent further reaction time of 3.5 h, the pressure dropped to 3.5 bar. Again, no catalyst activation was observed. Large amounts of unreacted propylene oxide had to be removed under reduced pressure. Further relevant data are given in table 1.

TABLE 1

| Example | Does intermediate A1 contain the salt of an inorganic Brønsted acid having a pKa < 1? | Stripping temperature before DMC step ($T_s$) [° C.] | $T_R/A_R$ [h * ° C./%] | OHN of end product (polyoxy-alkylenepolyol 1) after step ii) [mg KOH/g] | (Molar amount [mol] of basic catalyst)/molar amount [mol] of active H atoms of the starter compound(s)) | $OHN_{A1}/T_R$ |
|---|---|---|---|---|---|---|
| 1 | yes | 130 | 5.15 | 391 | 1/5250 | 5.68 |
| 2 | yes | 130 | 2.81 | 392 | 1/5700 | 4.62 |
| 3 | yes | 130 | 3.90 | 425 | 1/4500 | 4.62 |
| 4 | yes | 130 | 2.69 | 391 | 1/5400 | 4.62 |
| 5 | yes | 130 | 5.63 | 393 | 1/5900 | 6.00 |
| 6 | yes | 130 | 1.35 | 394 | 1/5550 | 5.60 |
| 7 | yes | 130 | 4.00 | 431 | 1/6000 | 4.62 |
| 8 | yes | 130 | 5.56 | 382 | 1/5150 | 6.00 |
| 9 | yes | 130 | 5.57 | 384 | 1/4900 | 4.30 |
| 10 | yes | 130 | 2.64 | 402 | 1/5850 | 4.62 |
| 11 | yes | 130 | 2.64 | 395 | 1/5700 | 4.62 |
| 12 | yes | 130 | 3.03 | 244 | 1/5900 | 5.60 |
| 13 | yes | 130 | 3.94 | 292 | 1/5950 | 4.62 |
| V1 | yes | 130 | 6.00 | n.d. | 1/5800 | 5.60 |
| V2 | no | 130 | 5.20 | n.d. | 1/240 | 5.68 |
| V3 | yes | 150 | 5.25 | n.d. | 1/5500 | 5.60 |
| V4 | no | 130 | 3.90 | n.d. | 1/6000 | 4.62 |

$T_R$: activation and/or reaction temperature in the DMC-catalyzed reaction step
$A_R$:(target) alkylene oxide metering rate in the DMC-catalyzed reaction step as the percentage of the total mass of alkylene oxide metered in which is metered in per hour
n.d.: not determined, since the metered addition of alkylene oxide had to be stopped before attainment of the target amount because the reactivity was too low

The invention claimed is:

1. A process for preparing a polyoxyalkylene polyol 1) by reacting at least one H-functional starter compound with at least one alkylene oxide, comprising the following steps:
    i) providing a component A) comprising a polyoxyalkylene polyol A1) having a calculated OH number ($OHN_{A1}$) of 600 to 1060 mg KOH/g and a neutral or acidic salt of an inorganic Brönsted acid by
        i-1) reacting an H-functional starter compound with one or more alkylene oxides B1) in the presence of a basic catalyst,
        and
        i-2) reacting the mixture resulting from i-1) with a Brönsted acid having a pKa<1,
    and
    ii) subsequently reacting component A) with one or more alkylene oxides B2) in the presence of a DMC catalyst, wherein
        ii-1) component A) resulting from step i) is admixed with a DMC catalyst and stripped at a temperature $T_S$ of not more than 145° C.
        and
        ii-2) the mixture resulting from ii-1) is reacted with one or more alkylene oxides B2) to give a polyoxyalkylene polyol 1), where the quotient of the reaction temperature $T_R$ and the alkylene oxide metering rate $A_R$, in which $A_R$ is defined as the percentage of the total mass of alkylene oxide to be metered in which is metered in per hour, is $T_R/A_R<5.9[h*° C./\%]$ wherein the OH number of the resultant polyoxyalkylene polyol 1) obtained after performance of step ii) is ≥200 mg KOH/g;
and wherein the ratio of the calculated OH number of the polyoxyalkylene polyol A1) ($OHN_{A1}$) to the reaction temperature $T_R$ in step ii) satisfies the following inequation:

$3.0 \leq OHN_{A1}/T_R<6.3[mg KOH/(g*° C.)]$.

2. The process as claimed in claim 1, wherein in step i-1), said basic catalyst comprises an alkali metal hydroxide, alkaline earth metal hydroxides, an alkali metal hydride, an alkaline earth metal hydride, an alkali metal carboxylate, an alkaline earth metal carboxylate, or combinations thereof.

3. The process as claimed in claim 1, wherein in step i-1), said basic catalyst comprises an alkali metal hydroxide.

4. The process as claimed in claim 1, wherein said basic catalyst in step i-1) comprises sodium hydroxide, potassium hydroxide and/or cesium hydroxide.

5. The process as claimed in claim 1, wherein in step i-1), the ratio [(molar amount [mol] of basic catalyst)/(molar amount [mol] of active hydrogen atoms in the starter compound(s))] is at least 1/8000.

6. The process as claimed in claim 1, wherein in step i-1), the alkylene oxide B1) comprises propylene oxide, ethylene oxide, or a mixture of propylene oxide and ethylene oxide.

7. The process as claimed in claim 1, wherein in step ii), the alkylene oxide B2) comprises propylene oxide, ethylene oxide, or a mixture of propylene oxide and ethylene oxide.

8. The process as claimed in claim 1, wherein in step i-2), a Brönsted acid having a pKa<0 is used.

9. The process as claimed in claim 1, wherein the polyoxyalkylene polyol 1) obtained after step ii) has an OHN of >250 mg KOH/g.

10. The process as claimed in claim 1, wherein the stripping temperature $T_S$ ranges from 90 to 135° C.

11. The process as claimed in claim 1, wherein the molar mass of the polyoxyalkylene polyol 1) is at least 44 g/mol higher than the molar mass of the polyoxyalkylene polyol A1).

12. A polyoxyalkylene polyol 1) obtainable by the process of claim 1.

13. A process for the preparation of polyurethanes comprising reacting an isocyanate component with an isocyanate-reactive component wherein the isocyanate-reactive component comprises the polyoxyalkylene polyols 1) as claimed in claim 12.

14. A polyurethane comprising the reaction product of an isocyanate component with an isocyanate-reactive component wherein the isocyanate-reactive component comprises the polyoxyalkylene polyols 1) as claimed in claim 12.

15. The process as claimed in claim 1, wherein the DMC catalyst in II) is present in an amount of ≤150 ppm, based on weight of the overall reaction mixture.

* * * * *